United States Patent [19]
Banister et al.

[11] Patent Number: 6,064,691
[45] Date of Patent: May 16, 2000

[54] METHOD AND APPARATUS FOR ACQUISITION OF THE STRONGEST PILOT SIGNAL

[75] Inventors: Brian Banister, San Diego; Mark Davis, Carlsbad; Roland Rick, San Diego, all of Calif.

[73] Assignee: LSI Logic Corporation, Milpitas, Calif.

[21] Appl. No.: 08/956,206

[22] Filed: Oct. 22, 1997

[51] Int. Cl.[7] .................................................. H04B 1/69
[52] U.S. Cl. ......................... 375/208; 375/206; 375/367; 370/515; 370/350
[58] Field of Search ................................... 375/206, 208, 375/340, 367; 455/502, 67.6, 67.4; 370/335, 350, 320, 252, 515, 342

[56] References Cited

U.S. PATENT DOCUMENTS

| | | | |
|---|---|---|---|
| 5,109,390 | 4/1992 | Gilhousen et al. | 370/335 |
| 5,440,597 | 8/1995 | Chung et al. | 375/200 |
| 5,530,716 | 6/1996 | Lipa | 375/206 |
| 5,577,022 | 11/1996 | Padovani et al. | 370/332 |
| 5,710,768 | 1/1998 | Ziv et al. | 370/342 |
| 5,768,306 | 6/1998 | Sawahashi et al. | 375/206 |
| 5,781,543 | 7/1998 | Ault et al. | 370/342 |
| 5,805,648 | 9/1998 | Sutton | 375/367 |

OTHER PUBLICATIONS

D. Dicarlo, "Multiple Dwell Serial Search: Performance and Application to Direct Sequence Code Acquisition", IEEE Transactions on Communications, vol. COM–31, No. 5, May, 1983, pp. 650–659.

*Primary Examiner*—Stephen Chin
*Assistant Examiner*—Lenny Jiang
*Attorney, Agent, or Firm*—Mitchell, Silberberg & Knupp LLP

[57] ABSTRACT

When a mobile communication unit (e.g. a cellular telephone) is powered up, the unit must lock on to a local base station, or "acquire" a base station signal, to enable the user to send and receive calls. To lock on a local base station, the mobile unit must determine the delay at which the base station is sending the pseudo random (PN) code. This process is called the "acquisition." The current art of acquiring a base station involves searching the possible code phases, or delays, one by one until the first signal is found. However, multiple base stations may be available to the mobile user, and the first found pilot signal may not be the strongest and may not be from the nearest base station. The present invention discloses a method and apparatus for searching all possible PN code phases and selecting the strongest phase instead of selecting the first phase. The method comprises of steps of testing all PN code delays, storing the delay and its corresponding signal strength of the delays having a signal strength greater than a threshold, and finally selecting the delay with the strongest signal among the stored delays.

19 Claims, 2 Drawing Sheets

METHOD AND APPARATUS FOR ACQUISITION OF THE STRONGEST PILOT SIGNAL

BACKGROUND OF THE INVENTION

1. Field of the Invention

The present invention generally relates to the art of wireless mobile communication system. In particular, the present invention relates to the art of searching for the pilot signals of base stations to establish communication between a mobile unit and the base station.

2. Description of Related Art

In wireless communications technology, user data (e.g. speech) is encoded in a radio frequency for transmission and reception between a base station and a mobile unit. The radio spectrum allocated by regulatory authorities for a wireless system is "trunked" to allow simultaneous use of that spectrum block by multiple units.

The most common form of trunked access is the frequency-division multiple access (FDMA) system. In an FDMA system voice is commonly transmitted through analog modulation but can in principle be digitized and transmitted with digital modulation. In FDMA, the spectrum is divided into frequency channels comprised of distinct portions of the spectrum. The limited frequency channels are allocated to users as needed. However, once a frequency channel is assigned to a user, that frequency channel is used exclusively by the user until the user no longer needs the channel. This limits the number of concurrent users of each frequency channel to one, and the total number of users of the entire system, at any instant, to the number of available frequency channels.

Another common trunking system is the time-division multiple access (TDMA) system. TDMA is commonly used in telephone networks, especially in cellular telephone systems, in combination with an FDMA structure. In TDMA, data (speech) is digitized and compressed to eliminate redundancy thus decreasing the average amount of bits required to be transmitted and received for the same amount of information. The timeline of each of the frequency channels used by the TDMA system is divided into "frames" and each of the users sharing the common channel is assigned a time slot within the frames. Each user then transmits a burst of data during its assigned timeslot and transmits nothing during other times. With the exception of delays required by the bursty data transmission, the TDMA system will appear to each of the users sharing the frequency channel to have provided an entire channel to each user.

The FDMA and TDMA combination technique is used by the GSM (global system for mobile communications) digital cellular system. In GSM, each channel is divided up in time into frames during which eight different users share the channel. A GSM time slot is only 577 $\mu$s (micro-seconds), and each users gets to use the channel for 577 $\mu$s every 4.615 ms (milli-seconds). 577 $\mu$s*8=4.615 ms.

Yet another method for sharing a common channel between multiple users is the code-division multiple access (CDMA) technique using direct sequence spread spectrum modulation. CDMA is relatively new to the cellular technology and is one of the accepted techniques to be included into the next generation of digital cellular systems in the United States of America (U.S.A.).

As with TDMA, the CDMA systems are typically used in conjunction with a FDMA structure, although this is not required. However, unlike the TDMA system, the CDMA system does not separate the multiple users of a common frequency channel using time slices. Rather, in CDMA, multiple users are separated from each other by superimposing a user-specific high-speed code on the modulation of the data of each user. Because the separating code has the effect of spreading the shared channel of each user's transmission, the CDMA system is often called a "spread spectrum" system.

"Direct sequence" spreading is accomplished by multiplying a narrowband information carrying signal by a much wider band spreading signal. The error coded and digitally modulated data (speech) for each of the shared users of the CDMA channel may typically be 9.6, 14.4, or 19.2 KHz wide. This is spread using a much wider spreading signal which may be 1.2288 MHZ wide. Using the wider spreading signal, a CDMA frequency channel can accommodate many users-on code sub-channels. The spreading signal is usually a sequence of pseudo random bits (PN code) and is often called a "spreading code," or "chipping code" because it "spreads" or "chips" the much slower data bits. The PN code is different for differing users, allowing a user to distinguish its code sub-channel from other users' sub-channels on the same frequency channel. The PN sequence may be expressed as c(t), where the chipping function, c( ), is a function of time t. The PN sequence is generated using a linear feedback shift register (LFSR) which outputs a random-like sequence of digital ones and zeros. These digital ones and zeros are modulated to −1 and +1 respectively and filtered to give the chipping function c(t). Thus the chipping function has the property that $c(t)^2=+1$. The PN sequence generated by a N-register LFSR is $2_N-1$ chips long, though a common system artificially inserts a zero to extend the full sequence length to $2^{15}=32768$ chips. That system has a chip rate of 1.2288 MHz, so that the sequence repeats every 26.666 ms.

In a typical system, each base station maintains a pilot channel with its own identifying spreading code for the mobile units to refer to. A pilot signal is a spread signal with no underlying information modulation, such that the exact waveform is known by both transmitter and receiver, with the exception of the waveform timing. The mobile units use the pilot channel to synchronize themselves with the base station so they can effectively communicate with the base station. When a mobile unit is powered on, the mobile unit initially searches for a pilot channel in an attempt to establish a lock with a base station. This process is called "acquisition." In order to "acquire," or lock on, to a base station, the mobile must align its locally generated version of the PN sequence with the PN sequence of the base station by determiing the timing of the transmitted pilot's spreading sequence. The present invention provides for an improved acquisition technique.

At power up, a mobile unit must search for a pilot to synchronize its spreading sequence with that of a base station. The acquisition process is generally described using FIG. 1. FIG. 1 is a simplified diagram illustrating the major functions of the acquisition process.

In the simplified model of FIG. 1, the radio signal is received by an antenna 12. The signal at line 14 is a radio frequency signal which is about 800 to 900 MHz for cellular communications. The signal at line 14, $S_{14}$, can be expressed as $$S_{14}=d(t)c(t-D_{base})\cos(t)$$

where d(t) is the data (speech in digitized form);

$c(t-D_{base})$ is the PN short code at delay $D_{base}$ which is the base station delay; and cos(t) is the radio frequency carrier wave.

Of course, $c(t-D_{base})$ is the spreading code sequence used in the CDMA system, and would not be present in a non-CDMA system. A pilot signal contains no data, so in the case of a pilot signal d(t)=1 and is constant. The pilot signal spreading code is a different PN code from the data spreading code, allowing the two signals to be distiguished. Once the pilot code timing is known, that same timing can be applied to the data spreading code to allow the receiver to demodulate the digital data.

The process of acquisition, then, is the process of determining the value of $D_{base}$. Once the value of $D_{base}$ is determined, the mobile can use the same $c(t-D_{base})$ sequence to lock on to the base signal and remove the spreading code to retrieve the data, d(t).

The quadrature demodulator circuit 16 removes the carrier wave portion, cos(t), from the incoming RF signal and provides a complex valued baseband signal to the sampling circuit 20 which converts the analog RF into digital samples at the spread spectrum frequency of 1.2288 MHZ. At line 22, the signal can be expressed as $$S_{22}=d(t)c(t-D_{base})$$

The base station delay, $D_{base}$, is not known by the mobile unit at power up. If $D_{base}$ is known, then the PN code delay at the mobile unit, $D_{mobile}$, can be set to match $D_{base}$, and $S_{22}$ can be multiplied by $c(t-D_{mobile})$ to eliminate the spreading sequence to retrieve the data. Alternatively expressed, if $D_{mobile}=D_{base}$, then $$d(t)c(t-D_{base})c(t-D_{mobile}) = d(t)c(t-D_{base})c(t-D_{base}) = d(t); \text{ because } c(t)^2=1$$

Fixed Dwell Search System (FDSS)

Assuming that N=15 such that the full sequence length is $2^{15}$, at power up, $D_{base}$ is not known, and the mobile must test each of the $2^{15}$ possibilities to find $D_{base}$. In the Fixed Dwell Serial Search (FDSS) systems, $D_{base}$ is found by brute-force, trial and error method which can be outlined as follows (continuing to refer to FIG. 1):

1. The incoming signal is multiplied by a multiplier 24 by a PN code with an initial delay, $D_{test}$, 44.
2. The result of the multiplication is summed, or accumulated 28, for N number of chips, N being a predetermined number of chips. The pilot signal could be thought of as being constructed based on a sequence of zero's (0) and one's (1). It is common in the industry to refer to each digit of a digital spreading sequence as a "chip." For example, a digital spreading signal of a fixed duration containing 100 digital values can be called a set of 100 chips.
3. The energy of the accumulated value of the products are calculated 34 by taking a magnitude squared of the accumulant.
4. The calculated energy is compared to some pre-set threshold, γ, 38.
5. And, a determination is made. If the calculated energy equals or exceeds the threshold value, γ, then the given delay being tested, $D_{test}$, 44 is determined to be a potential signal and is verified. If the verification is successful, then $D_{test}$ is determined to equal $D_{base}$ and the acquisition terminates. If the calculated energy is less than the threshold value, then $D_{test}$ 44 is not equal to $D_{base}$, and the next delay value is tested beginning at step 1. In fact, the delay value is tested at every ½ chip. Therefore, the number of delays tested is $2 * 2^{15}$, or $2^{16}$.

The multiplication (step 1 above) and the summation (step 2) are typically done using a specially designed hardware, and is performed at the same speed as the incoming chip rate. The energy calculation (step 3) and the comparison with a threshold (step 4) could be performed in software by a digital signal processor (DSP) 42 as indicated by the dash line in FIG. 1

If the incoming signal at line 22, $S_{22}$, is multiplied by the correctly delayed PN code, then the sum, or integration, of the energy levels of a set of chips will add up to a signal strength approaching some amplitude value, A. If the incoming signal at line 22, $S_{22}$, is multiplied 24 by an incorrectly delayed PN code 44, then the signal at line 26, $S_{26}$, will appear as noise and the sum 28, or integration, of the energy levels of the set of chips will approach zero. The DSP 42, controls the value of D 44, to increment the phase based on the dwell/threshold decisions. This "de-spreading" method is discussed in many text and reference books. For example, see Redl, et. al., AN INTRODUCTION TO GSM, pp. 61–63. In reality, however, the results of the integration do not fall exactly at A or exactly at 0, but are corrupted by noise and fall near A or near 0, and appear as some probability function near A or 0.

In addition to the above method of increasing the number of concurrent users of a cellular communication system, the Space Division Multiple Access (SDMA) is almost universally used to increase the number of concurrent users of the system. As its name implies, the SDMA systems operate based on the fact that geographical regions, or spaces, can be logically divided up into cells. Then, the same channel can be reused in differing cells.

In SDMA, communications within each cell is typically handled by that cell's base station; however, when a user is attempting to acquire a base station, the user may lock on to a base station of an adjacent cell. The reason for the existence of this problem is the fact that the above described acquisition process locks on to the first pilot signal that the mobile unit detects instead of the strongest signal.

This problem can be illustrated by FIG. 2. When the mobile cellular telephone user 50 turns on a mobile telephone unit, the unit initiates the above-described acquisition process. Even though the user 50 is located in the cell 52 having base station 62, the user 50 may acquire base station 64, 66, or 68, located in cell 54, 56, and 58, respectively. If any of those base stations has a pilot signal the energy of which is (1) greater than the threshold, and (2) the PN code delay, or the code phase, of which is tested by the mobile unit before the code phase of base station 62, then the mobile unit will lock on that base station rather to base station 62 Even though the base station 62 may have a stronger signal.

The user's acquisition of a out-of-cell base station leads to inefficient allocation of channels and degrades the performance of the in-cell base station 62. Moreover, transmission of signal to station 64 requires too much signal strength from the mobile user, drowning out the closer station 62.

SUMMARY OF THE INVENTION

Therefore, an object of the present invention is to ensure that the mobile cellular unit acquires the strongest base station. The mobile unit acquires the strongest base station by testing the entire range of PN code phase delay and selecting the strongest signal rather than terminating the acquisition search after finding the first signal meeting the threshold level.

The present invention provides a method of synchronizing a cellular unit to a base station pilot signal, each base station's pilot signal being spread by a pseudo-random noise (PN) code having a delay and a signal strength. The method can be described as first determining the signal strength of the pilot signals at each PN code phase, then selecting a PN code phase having the greatest signal strength.

An alternative embodiment of the present invention provides for a method of selecting a base station by a cellular mobile unit in a CDMA (code-division multiple access) communications system, each of the base stations having a pilot signal spread with a pseudo-random (PN) code with a base station delay. The technique includes the step of dwelling for a set of chips at a test delay of the PN code sequence for each of all possible test delays of the PN code. Those phases resulting in an accumulated energy greater than a threshold are stored. Finally, a delay from said stored delays is selected. Typically, the delay having the strongest signal, as reflected by the strength of its accumulated energy, is selected.

The present invention also provides for a mobile communications apparatus with a multiplier, an accumulator, and a digital signal processor (DSP). The multiplier multiplies the incoming spread data sequence with a pseudo random noise (PN) spreading code, having a test delay, to obtain a product. The product is accumulated by the accumulator. Then, the DSP compares the product to a threshold, and selects a test delay. The delay having the greatest accumulant, or the signal strength, is typically selected.

Also provided for in the present invention is a machine-readable storage medium containing instructions for a processor to perform the techniques discussed in this disclosure.

These and other aspects, features, and advantages of the present invention will be apparent to those persons having ordinary skill in the art to which the present invention relates from the foregoing description and the accompanying drawings.

DETAILED DESCRIPTION OF THE PREFERRED EMBODIMENT(S)

Figure 3:
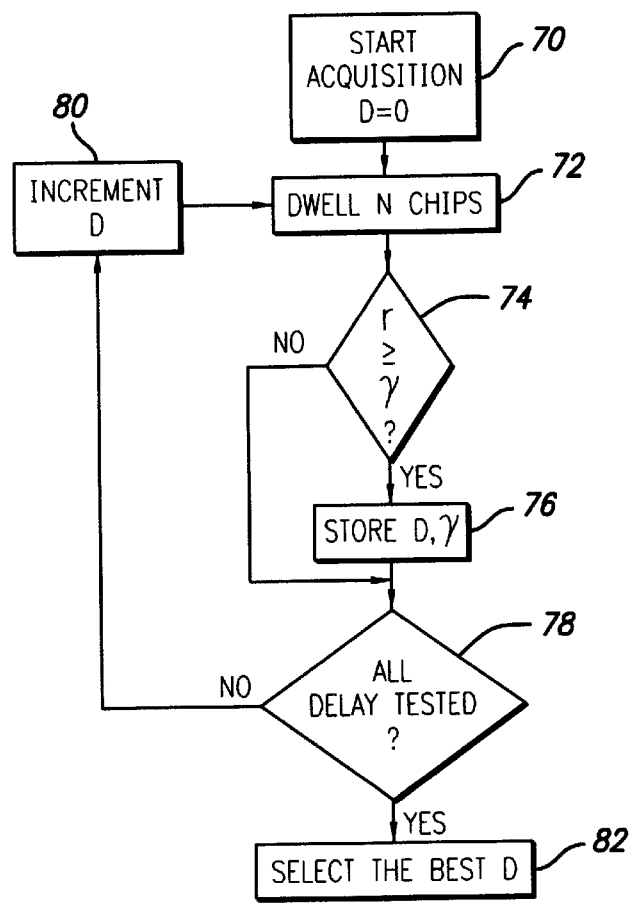
FIG. 3 is a flowchart illustrating present invention.

Referring to FIG. 3, a flowchart illustrating the method of the present invention is shown. The acquisition process according to the present invention can be described simply as first testing all possible PN code phases, or delays, to find all the pilot signals of the base stations of the area and then selecting the strongest pilot signal on which to lock.

More specifically, the acquisition process begins 70 by setting the code phase, or the delay, of the PN code to zero. Then, the mobile unit dwells 72 for a predetermined period of time at that test delay. Because each of the chips of the pilot signal is of fixed length of time, commonly 0.8 $\mu$s long, a count of the chips can be used to referred to, or specify, the perdetermined period of time. In this case, the mobile unit dwells for a predetermined number of chips.

Dwelling at a phase delay, or a delay, means that the incoming pilot signal is multiplied by the PN code having the test delay, and accumulating the product of the incoming signal with the delayed PN code. Then the accumulant, $\Gamma$, is compared 74 with a predetermined threshold $\gamma$. If $\Gamma$ is less than $\gamma$, then the incoming signal is rejected as noise or as a weak pilot. On the other hand, if $\Gamma$ is greater than $\gamma$, then the test delay and the signal strength, $\Gamma$, is stored.

The threshold, $\gamma$, is predetermined so as to allow the mobile unit to distinguish between noise and signal. In a preferred embodiment, of the $2^{16}$ possible PN phases, $\gamma$ is set to a level to filter all but a few strongest signals. In some implementations, $\Gamma$ is processed prior to being compared to $\gamma$. For instance, the value of $\Gamma$ may be squared before being compared to $\gamma$. If $\Gamma$ is processed, then $\gamma$ is also set to a value corresponding to the processed $\Gamma$. In a preferred embodiment, $\Gamma$ is a complex number, and must be squared in order for it to be compared to a read value.

After testing each delay, the test delay is incremented 80 and the process is repeated until all $2^{16}$ possible code phases, or delays, have been tested 78. After finishing the test process for all possible code phases 78, the strongest of the stored phases is selected 82 because the pilot signal from the nearest base station is likely to be the strongest signal.

Figure 1:
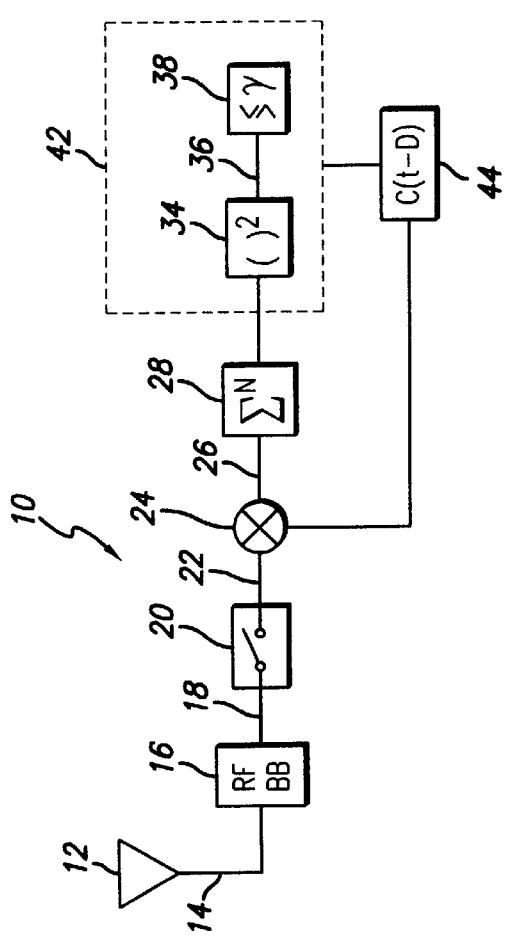
FIG. 1 is a simplified block diagram illustrating the major functions of a mobile communications unit.
Figure 4:
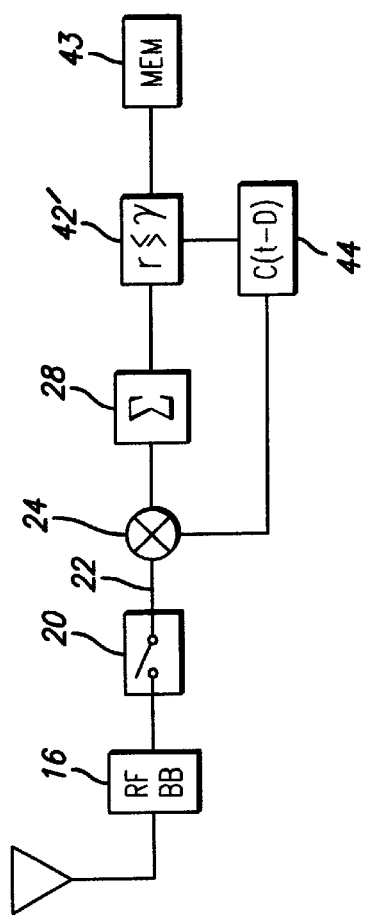
FIG. 4 is a block diagram illustrating an apparatus according to a preferred embodiment of the present invention.
Figure 2:
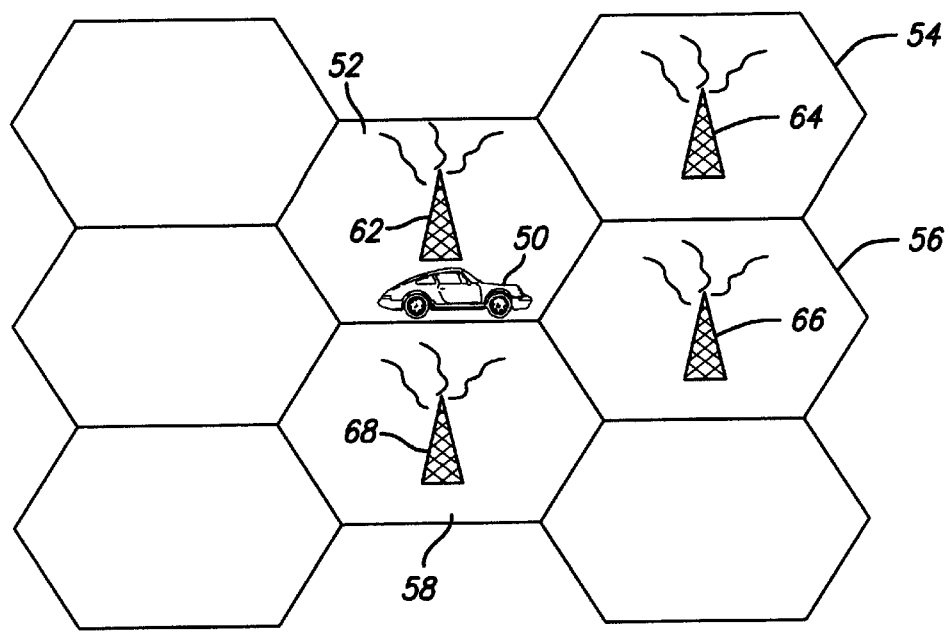
FIG. 2 is a diagram illustrating space division multiple access (SDMA) technique.

Referring now to FIG. 4 a mobile cellular unit according to the present invention is shown. As with the unit 10 shown in FIG. 1, the radio signal is received by an antennae 12. Then, the RF base band unit 16 removes the radio carrier wave and the digitizer 20 converts the analog signal to a digital signal. The multiplier 24 multiplies the incoming digitized signal 22 and the accumulator 28 accumulates the energy of the product of the multiplication.

The DSP 42' according to the present invention has the instructions to compare the accumulated value, the accumulant, to a predetermined threshold, and to select the test delay with the greatest energy level, or the accumulant value. Using a PN code generator and test delay value register 44, the DSP 42' tests the phase of the incoming signals for all $2^{16}$ delays, and stores the delay values if the energy of the delay is greater than the threshold. An external (to DSP 42') memory 43 may be connected to the DSP 42' to store the code phases and energy levels.

The instructions for the DSP 42' may be stored in any machine readable storage medium such as a semiconductor memory device, magnetic device, optical device, magneto-optical device, floppy diskette, hard drive, CD-ROM, magnetic tape, computer memory, and memory card.

Although the present invention has been described in detail with regarding the exemplary embodiments and drawings thereof, it should be apparent to those skilled in the art that various adaptations and modifications of the present invention may be accomplished without departing from the spirit and the scope of the invention. Accordingly, the invention is not limited to the precise embodiment shown in the drawings and described in detail hereinabove. Therefore, it is intended that all such variations not departing from the spirit of the invention be considered as within the scope thereof as limited solely by the claims appended hereto.

In the following claims, those elements which do not include the words "means for" are intended not to be interpreted under 35 U.S.C. § 112 ¶ 6.

What is claimed is:

1. A method of synchronizing a cellular unit to a base station pilot signal, each base station's pilot signal being spread by a pseudo-random noise (PN) code, said method comprising:

receiving a pilot signal;

determining a signal strength of the pilot PN signal at each of a number of different test phases, the number of different test phases being not less than a maximum number of chips in a non-repeating sequence of the PN code; and selecting a test phase corresponding to the greatest signal strength.

2. A method according to claim 1 wherein said step of determining the signal strength of the pilot signals comprises the steps:

a. dwelling for a predetermined time at a test phase of the PN code; and b. repeating step a for all possible test phases.

3. A method according to claim 2 wherein said step of dwelling comprises the steps:

multiplying the pilot signal with the PN code having said test phase, obtaining a product; and accumulating said product.

4. A method according to claim 3 further comprising the step of squaring the accumulant.

5. A method according to claim 2 further comprising the steps:

comparing the signal strength of each test phase of the pilot signal to a threshold; and storing the test phase and corresponding signal strength if said corresponding signal strength is greater than said threshold.

6. A method according to claim 5 further comprising the step of selecting a test phase from said stored phases, said selected test phase having the greatest signal strength of any stored test phases.

7. A method according to claim 5 wherein said threshold is predetermined to distinguish signal from noise.

8. A method according to claim 1, wherein the maximum number of chips in a non-repeating sequence of the PN code is $2^{15}$ chips.

9. A method of selecting a base station by a cellular mobile unit in a CDMA (code-division multiple access) communications system, each of the base stations having a pilot signal spread with a pseudo-random (PN) code with a base station delay, said method comprising:

a. dwelling for a set of chips at a test delay of a PN code sequence;

b. repeating step a for each of a number of different test delays of the PN code, the number of different test delays being not less than a maximum number of chips in a non-repeating sequence of the PN code;

c. storing all test delays resulting in an accumulated energy greater than a threshold; and d. selecting a test delay from said stored test delays.

10. A method according to claim 9 wherein said step of dwelling comprises the steps:

a. multiplying said set of chips with a set of chips of a pseudo-random noise (PN) code having a test delay; and b. accumulating the product.

11. A method according to claim 10 further comprising the step of squaring the accumulant.

12. A method according to claim 9 wherein said chip is a single bit.

13. A method according to claim 9, wherein the maximum number of chips in a non-repeating sequence of the PN code is $2^{15}$ chips.

14. A mobile communications apparatus comprising:

a multiplier to multiply an incoming spread data sequence with a pseudo random noise (PN) spreading code to obtain a product, said PN spreading code having a delay;

an accumulator, connected to said multiplier, for accumulating the product of said multiplier;

a digital signal processor (DSP) connected to said accumulator, said DSP having instructions to compare the accumulant with a threshold and to select the PN code delay having the greatest accumulant; and a test delay generator for repetitively supplying the PN spreading code to said multiplier, wherein a different delay is supplied at each repetition, and wherein a number of different delays supplied to said multiplier prior to selection of the PN code delay by said DSP is at least equal to a number of chips in the PN spreading code.

15. A mobile communications apparatus of claim 14 further comprising memory to store delays and accumulant values.

16. A mobile communications apparatus of claim 14 wherein said DSP having an additional instruction to square said accumulant prior to comparing the accumulant to said threshold.

17. A machine-readable storage medium containing instructions for a processor, said instructions comprising the steps for synchronizing a mobile communications device to a base station pilot signal having a base delay, said instructions comprising:

a. dwelling for a set of chips at a test delay of a PN code sequence;

b. repeating step a for each of a number of different test delays of the PN code, the number of different test delays being not less than a maximum number of chips in a non-repeating sequence of the PN code;

c. storing all test delays resulting in an accumulated energy greater than a threshold; and d. selecting a test delay from said stored test delays.

18. A storage medium according to claim 17 wherein said storage medium is selected from a group consisting of semiconductor memory device, magnetic device, optical device, magneto-optical device, floppy diskette, hard drive, CD-ROM, magnetic tape, computer memory, and memory card.

19. A machine-readable storage medium according to claim 17, wherein the maximum number of chips in a non-repeating sequence of the PN code is $2^{15}$ chips.

* * * * *